United States Patent [19]

Stanley

[11] 4,033,194

[45] * July 5, 1977

[54] SYNCHRONIZED LINEAR ACTUATOR

[76] Inventor: Richard B. Stanley, 313 S. 2nd St., Oregon, Ill. 61061

[ * ] Notice: The portion of the term of this patent subsequent to June 29, 1993, has been disclaimed.

[22] Filed: June 12, 1975

[21] Appl. No.: 586,155

[52] U.S. Cl. .......................... 74/89.15; 74/424.8 R
[51] Int. Cl.² .......................................... F16H 27/02
[58] Field of Search ............. 74/89, 89.15, 424.8 R, 74/459

[56] References Cited

UNITED STATES PATENTS

| | | | |
|---|---|---|---|
| 2,924,112 | 2/1960 | Martens | 74/459 |
| 3,173,304 | 3/1965 | Strandgren | 74/459 |
| 3,244,021 | 4/1966 | Antila | 74/459 |
| 3,269,199 | 8/1966 | Deehan et al. | 74/424.8 R |
| 3,585,869 | 6/1971 | Lemor | 74/459 |
| 3,595,094 | 7/1971 | Lemor | 74/459 |

Primary Examiner—Samuel Scott
Assistant Examiner—Wesley S. Ratliff, Jr.
Attorney, Agent, or Firm—McWilliams & Mann

[57] ABSTRACT

A linear actuator of the threaded shaft actuator type comprising a rotary threaded shaft and a special bearing unit secured to the member to be moved linearly, in which the bearing unit comprises a plurality of rollers each having a plurality of radial right flanges intermediate their ends spaced apart and scheduled to complement the pitch of the shaft threading for rolling engagement therewith, which rollers at their ends are formed with bearing surfaces that are oblique relative to their axes that ride in spaced apart raceways defined by an outer race structure which in turn is secured to the member to be moved linearly. The rollers are received in non-journaling relation in a roller support that supports the rollers adjacent the respective roller raceways in the event of removal of the bearing unit from the shaft, and keys the rollers against orbiting about the shaft on rotation of the shaft, with the roller support itself being held against rotation about the shaft by connection to the member to be moved linearly but transmitting to such member the desired linear movement which is synchronized with the lead of the shaft threading.

4 Claims, 6 Drawing Figures

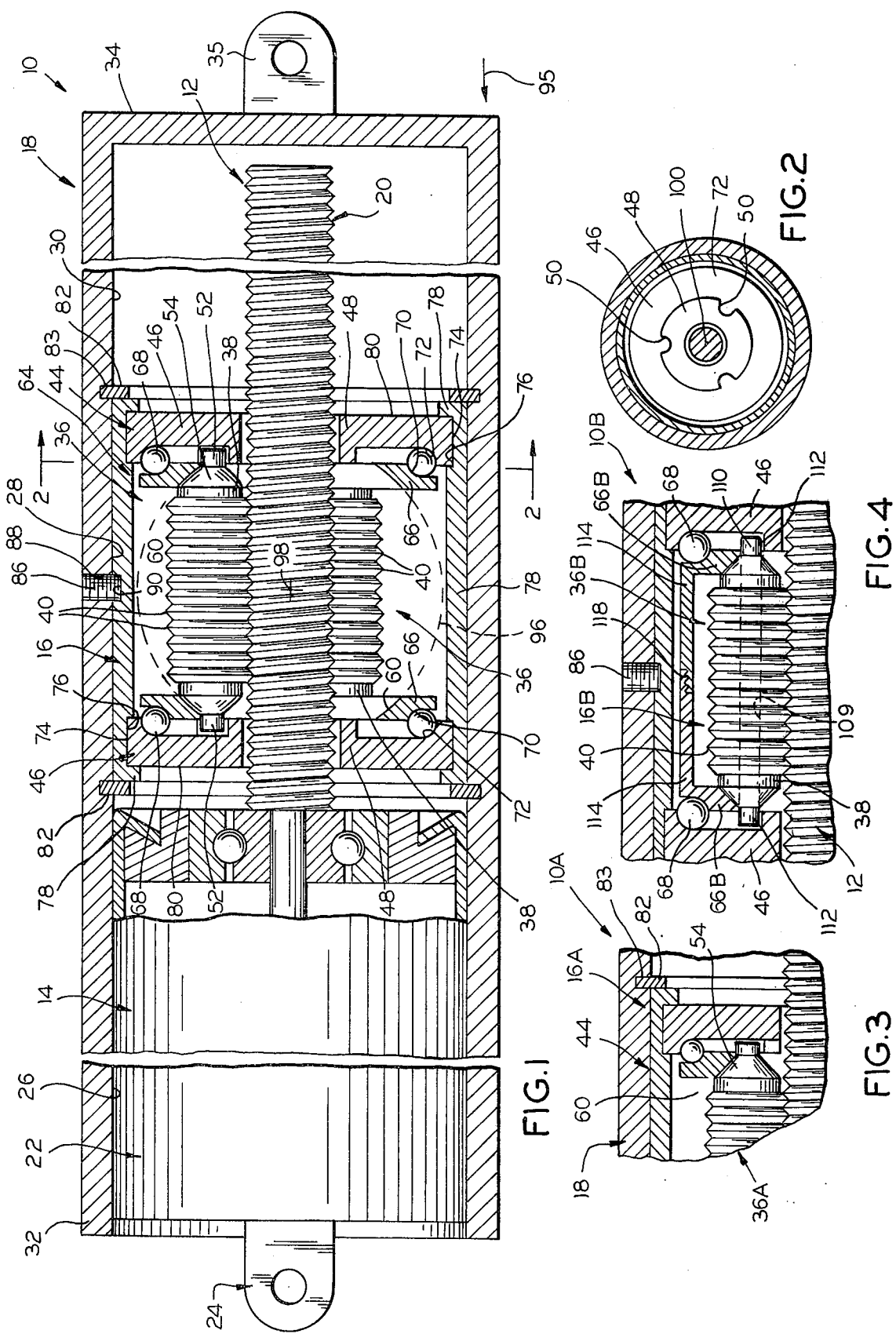

SYNCHRONIZED LINEAR ACTUATOR

This invention relates to a linear actuator, and more particularly, to a linear actuator of the type described in my U.S. Pat. Nos. 3,861,226 and 3,965,761, which are concerned with devices for converting rotary motion to linear motion with high force conversion factors over any desired distance at low speed.

Conventional mechanical devices, prior to the Applicant's above referred to invention that are employed for converting rotary motion to linear motion, fall into one of three basic groups, namely screw and nut devices, which provide reasonable force conversion ratios at low effeciency, ball and nut devices, which provide high efficiency, but with low force conversion ratios, and rack and gear devices which provide low force conversion ratios at low efficiency. Furthermore, while conventional solenoid actuated linear movement producing type devices provides low force application at high speed for short distances using electrical energy, prior to the Applicant's inventions referred to above, there was not in general use any practical method of using electrical energy to provide high force at low speed over comparatively long distance.

The Applicant's inventions of said patent and patent application are concerned with linear actuators of wide basic utility employing a threaded shaft member, a tubular member telescopingly receiving the shaft member, and a special bearing unit interposed between the shaft and tubular members in which the bearing unit comprises a plurality of free rolling roller elements each formed with right flanges and flutes proportioned for meshing engagement with the threads of the threaded member, and that ride on a raceway of the other member in resisting radial loads. The roller elements are free of any mounting or restraining bearings, have the orientation of their flanges scheduled in accordance with the pitch of the threading, and have thrust loads applied to their shanks so that all of the rollers take thrust loads to an extend not heretofore possible. The drive is preformed through the rolling friction of the bearing parts involved, which is generated by the resistance encountered, the arrangement being such that the greater load to be handled, the greater the friction there is available to handle it.

In one exemplary embodiment of the inventions of said patent and patent application, it is the tubular member that is moved linearly, and the shaft that is rotatably driven, and as an example of the possibilities involved, the threading of the tubular member may be pitched in accordance with any desired force conversion factors, such as 3 or 500 to 1, and the tubular member can be of such length, as may be necessary or desirable, to provide linear movement of the tubular member at high force over the desired distance. As only rolling friction is involved in the motion converting bearing unit, and its relation to the driving shaft and driven tubular member, efficiencies are on the order of 90 per cent. The bearing unit involved is no larger than conventional ball bearing units for journaling shafts.

The present invention is concerned with linear actuator arrangements of this general type, wherein the linear movement provided is synchronized with the lead of the shaft threading involved.

A principal object of the present invention is to provide a linear actuator of the type disclosed in said patent and patent application wherein linear motion is provided that is synchronized with the lead of the shaft threading.

Another principal object of the invention is to provide a linear actuator arrangement of synchronized linear movement characteristics that has high load carrying capacity, that operates at low speed over any desired distance, that is composed of few and simple parts adapted for inexpensive manufacturing operations, and that operates at efficiencies on the order of 90 per cent.

Another principal object of the invention is to provide a synchronizing motion translating bearing unit for use with threaded shafts to convert rotary motion to linear motion, which bearing unit is comparable in size and simplicity to the ordinary conventional ball bearing units commonly employed for shaft journaling purposes, but which is arranged for mounting and securement to the parts to be moved linearly on rotation of the threaded shaft.

Other objects of the invention are to provide a linear actuator bearing arrangement that provides the efficiency advantages of ball nut devices at a fraction of the cost, to provide a linear actuator arrangement that is internally self-aligning, and to provide a linear actuator arrangement that is economical of manufacture, convenient to install and use, and that is susceptible to a wide variety of applications for general purpose use.

In accordance with the present invention, a linear actuator of the rotatable threaded shaft type is provided which is concerned with a simplified bearing unit arranged for ready connection to the member to be moved linearly, as well as ready operable association with the shaft. The bearing unit comprises a plurality of rollers, ordinarily three to four in number, each having a plurality of right radial flanges spaced apart and scheduled longitudinally of the respective rollers to complement the pitch of the shaft threading for rolling interfitting engagement with the shaft threading, with the rollers aligned transversely of the shaft. The rollers at their ends are formed with bearing surfaces that are oblique relative to their longitudinal axes, which bearing surfaces ride on spaced apart raceways of an outer race structure that is arranged for securement to the member to be moved linearly. Following the teachings of the Applicant's said patents, the rollers are free rolling and are unjournaled at their ends, and no spacing device is required as their interfitting with the shaft threading together with the scheduling of their flanges along their shanks for that purpose achieves that end. The bearing unit is provided with a roller support for supporting the flanged rollers radially when the shaft is separated from the bearing unit, to facilitate reapplication of the shaft to the bearing unit.

The outer race structure of the bearing unit is received within the roller support, with the outer race structure being journaled relative to the roller support through rolling bearing type journaling means. The roller support itself is keyed to the member that is to be moved linearly, and comprises a pair of spaced apart annular holder members received over the shaft in concentric relation thereto to which the individual rollers are keyed to hold them against orbiting about the shaft on rotation of the shaft. On rotation of the shaft, the tractional engagement of the roller flanges with the shaft threading causes the rollers to roll on the shaft and roll relative to the raceway structure involved. The rollers are held against orbiting about the shaft and the outer race structure rotates relative to the roller support under the driving action of the rollers. The rollers serve as a low rolling friction composite nut providing linear movement of the roller support that is synchronized with the lead of the shaft threading.

Other objects, uses and advantages will be obvious or become apparent from a consideration of the following detailed description and the application drawings in which like reference numerals indicate like parts throughout the several views.

In the drawings:

FIG. 1 is a longitudinal sectional view partially in elevation, showing a specific linear actuator device arranged for commercial application and embodying the principles of the present invention;

FIG. 2 is a diagrammatic transverse cross-sectional view taken substantially along line 2—2 of FIG. 1, but on a smaller scale and with the bearing balls of FIG. 1 omitted;

FIG. 3 is a fragmental view similar to the showing of FIG. 1 but illustrating a modified form of the invention;

FIG. 4 is similar to that of FIG. 3 but illustrating yet another modified form of the invention;

Figure 6:
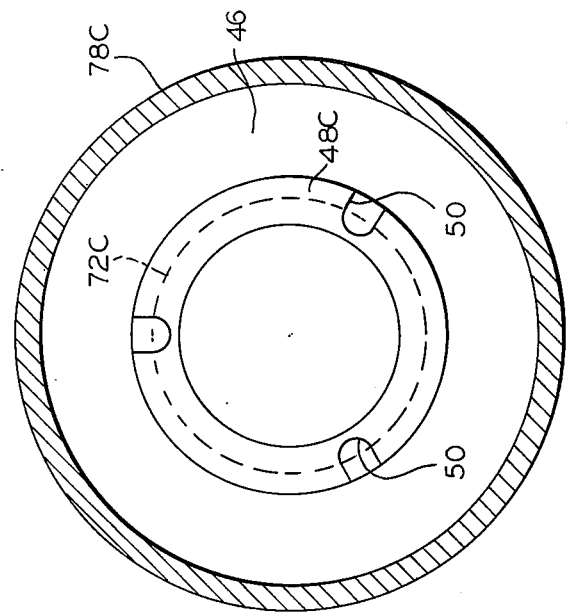
FIG. 6 is a view similar to that of FIG. 2 but along line 6—6 of FIG. 5 illustrating the roller annular holder member of this embodiment, with the ball bearings and outer race structure of FIG. 5 omitted.

However, it is to be understood that the specific drawing illustrations supplied are provided primarily to comply with the disclosure requirements of the Patent Laws, and that the invention is susceptible of modifications and variations that will be obvious to those skilled in the art, and which are intended to be covered by the appended claims.

GENERAL DESCRIPTION

Reference numeral 10 of FIG. 1 generally indicates a linear actuator device arranged in accordance with the present invention, which comprises a threaded shaft 12 rotated by a suitable electric motor 14, bearing unit 16 operably associated with the threaded shaft 12 and arranged to convert rotary motion to linear motion, and a tubular member 18 to which the bearing unit 16 is secured for moving the tubular member 18 longitudinally of the axis of shaft 12 on operation of motor 14, and in a manner that is synchronized with the lead of the shaft threading 20.

In the form shown, the shaft threading 20 is of the external V type having 45° angulation. The shaft 20 is suitably connected to the driving components of motor 14 (not shown), which driving components are housed in a suitable motor housing 22 that in the simplified form illustrated includes suitable bracket 24 adapted for securement to one of the components that the actuator 10 is to be secured between.

The tubular member 18 in the form shown comprises a bore portion 26 that receives the motor 14, a bore portion 28 in which the bearing unit 16 is applied, and a bore portion 30 into which the shaft 12 extends in the contracted relation of the device. The tubular member 18 in the specific form shown has an open end 32 from which the motor 22 is exposed as the device is operated to move toward its extended relation, and a closed end 34 provided with suitable attachment bracket 35 that is adapted for securement to the other component that the actuator 10 is to be secured to.

The bearing unit 16 generally comprises a plurality of rollers 36 (three in the illustrated embodiments) each having their shanks 38 formed to define a plurality of right radial flanges or ridges 40 having the same pitch as threading 20 and of complementary 45° angulation for complementary interfitting therewith to be in rolling engagement thereto. Following the general arrangement of my said patent, the ridges or flanges 40 are scheduled longitudinally of the respective roller shanks 38 in accordance with the circumferential location on the particular rollers in the bearing unit to accomodate the lead on the threading 20, so that the rollers 36 are aligned transversely of the shaft.

In accordance with the present invention, the individual rollers 36 are received in a roller support 44 that is annular in configuration and is received in substantially concentric relation about the shaft 12. The roller support 44 comprises a pair of spaced apart annular holder member or ring members 46, which in the form illustrated, each define a hub portion 48 defining operating cavity or recesses 50 for keying the respective rollers thereto, with the respective rollers 36 each having an end portion 52 of reduced diameter received in the respective cavities 50 in the assembled relation of the bearing unit.

However, following the teaching of my said patent and application, the rollers 36 are not journaled in the roller support 44, but rather their ends are loosely received in the respective cavities 50. The interfitting of the flanges 40 of the respective rollers with the shaft threading 20 effects the desired circumferential spacing of the rollers about the shaft, in accordance with the scheduling of the flanges 40 of the respective roller 36.

The rollers 36 are each formed with bearing surfaces 54 adjacent to but spaced from their respective reduced ends 52, which ride on the respective raceways 60 of the bearing unit outer race structure 64, which comprises a pair of ring members 66 disposed in spaced apart relation in thrust load transmitting relation to bearing balls 68, which ride on the respective raceway surfaces 70 of their respective members 66, and raceway surfaces 72 of the respective roller holder members 46.

The annular holder members 46 are secured together in the spaced apart relation indicated by having their respective rims 74 seated in the counterbored end portions 76 of sleeve member 78 and suitably held in place by coining the respective sleeve end portions 78 against the respective side surfaces 80 of the respective holder members, as indicated at FIG. 1.

In the embodiment of FIG. 1, the rollers 36, the ring members 66, the bearing balls 68, and holder members 46, as applied to the sleeve member 78, complete the bearing unit 16, it being understood that the bearing balls 68 may be incorporated in any suitable bearing ball spacing and sealing arrangement as may be necessary and desirable whereby the bearing balls will be disposed in equally spaced relation about the bearing unit.

In the form shown, the bearing unit 16 is applied to the tubular member 18, as by being disposed between conventional locking rings 82 in the respective grooves 83 formed in member 18 for this purpose, and by being keyed against rotation relative to the tubular member 18 by a suitable set screw 86 received in the threaded opening 88 of tubular member 18 and seated againt a recess 90 formed in sleeve 78 for that purpose. The recess 90, of course, may be in the form of a circumferential groove about the periphery of sleeve 78 for ease of application.

To assemble a bearing unit 16, one of the holder members 46 may be mounted in its illustrated operating position and then the bearing ball assemblies that include balls 68, race rings 66, and the rollers 36 that are to be applied to the assembled holder 44 being applied as indicated, followed by the second race ring 66, the second ball bearing assembly involving balls 68, and the remaining holder member 46, which should be oriented relative to the initial holder member 46 so that the recesses 50 of the two holder members 46 are axially aligned. The assembly is completed by coining or otherwise affixing in place, with respect to the sleeves 78 the just assembled holder member 46. Of couse, instead of coining, screwthreading or recessed set screws may be employed for this purpose (as well as other suitable securing means).

The proportioning of the raceway surfaces 60, and the roller bearing surfaces 54 and their reduced ends 52 is such that in the assembled relation the roller surfaces 54 ride on the raceway surfaces 69 while the roller ends 52 are spaced from journaling engagement with the surfaces of the respective members 46 that define the recesses 50, also; the flanges 40 of the rollers 36 are in rolling engagement with the shaft threading 20.

It is to be noted that raceway surfaces 60 are of circular contour transversely of shaft 12 and across the area of same that is engaged by the respective roller bearing surfaces 54, and that such raceway surfacing areas may be considered to be defined by surfaces of revolution about the shaft axis that are smoothly contoured longitudinally of the shaft axis. Also, the recesses 50 of the holder members 46 are disposed in circumferentially spaced relation about the respective ring members 46, with said recesses 50 being circumferentially aligned at the radial level (about shaft 12) that is indicated in FIG. 2, relative to the corresponding radial level of the outer raceway surfaces 60. The proportioning of the surfaces 52, 54 and 60 that is referred to involves the raceway surfaces 60 being radially outward of but adjacent the radial level of recesses 50 for maintaining the rollers 36 in rolling engagement with the shaft threading 20.

Assuming that the linear actuator 10 is applied between two components arranged for relative movement (for instance, one component fixed and the other mounted for movement axially but not rotationally of shaft 12, as for instance, in a power seat application) by employing the brackets 24 and 35 and suitable fastening devices in connection therewith, on actuation of motor 14 to rotate shaft 12, the roller support 44 is held against rotational movement (by its connection to tubular member 18), which holds the individual rollers 40 against orbiting about shaft 50. However, the rollers 40 are in rolling traction engagement with both the shaft theading 20 and the raceway surfaces 60, whereby the rollers 36 rotate about their respective axes, and the race rings 66 accordingly rotate in the opposite direction, within the bearing unit 16, in rolling engagement with the respective bearing balls 68 which in turn are riding on the respective raceway surfaces 72 of the roller holder members 46. Since in the showing of FIG. 1, the device is shown in its fully retracted relation, the direction of rotation of the shaft 12 will be such to feed the bearing unit 16, and thus tubular member 18, to the right of FIG. 1.

The rollers 36 in being held against orbiting about the shaft 12, act as a composite stationary nut, without the sliding friction problems of stationary nuts, and effects linear motion of the bearing unit 16, and thus of the tubular member 18, that is synchronized with the lead of the shaft threading 20. Actuation of the motor 14 (which is assumed to be reversibly driveable) in the opposite direction will induce linear movement in the bearing unit 16, and thus the tubular member 18, in the opposite direction, but again with a movement that is synchronized with the lead of the shaft threading 20.

Following the teachings of my said patents, the pitch of the threading 20 may be made as desired to achieve the force conversion characteristics that are desired for a particular linear actuator device. As the pitch of the threading 20 defines the pitch and corresponding feed rate of the device 10, and pitch is inversely proportional to the force conversion factors of the unit, in accordance with the applicable laws of mechanics, it will be seen that as zero pitch is approached, the force conversion factors approach infinity, making theoritically available large force output capabilities at slow speed where adequate purchase between the shaft 12 and the tubular member 18 can be achieved.

In the illustrated embodiments of the present application, this purchase is achieved in the same manner as disclosed in my said patents. Thus, assuming that a load is acting on the tubular member in the direction indicated by the arrow 95 (see FIG. 1), and the motor 14 and the parts it is connected to are held against movement, the force acting in the direction of the arrow 95 is applied to the shaft 12 through the shear relation provided by the intermeshing parts of the unit 16 and lock rings 82. As loads are increased, friction forces, through which the rotating shaft 12 acts on the rollers 36 (to resist a load) increase. This permits the transfer by the bearing unit, through the roller bearing surfaces 54, race ring 62, bearing balls 68, holder members 46, and sleeve 16, to the tubular member 18 the forces made possible by the force conversion factors involved in a particular pitch that is used in the shaft threading 20, either to hold the tubular member 18 against movement, or to move same linearly as desired on operation of the motor 14. Forces acting in the opposite direction are handled in a similar manner.

In the form of FIGS. 1 and 2, the roller bearing surfaces 54 and the race ring surfaces 60 are of complemental spherically contoured configuration, with the surfaces being struck about an arc 96 having its center 98 lying on the longitudinal central axis 100 of the bearing unit 16 and shaft 12, whereby the bearing unit parts are internally self-aligning to accommodate limited misalignment of the shaft 12 with respect to the tubular member 18.

In the bearing unit 10A of FIG. 3, the corresponding bearing surfaces 54 and raceway surfaces 60 are of complemental 45 degree angle frusto-conical configuration. The linear actuator 10A of FIG. 3 is otherwise the same as linear actuator 10.

In the linear actuator 10B of FIG. 4, the rollers 36B are tubular in configuration and lack the end portions 52 of FIG. 1; each roller 36B receives through its bore 109 a pin 110 having its respective end portions 112 conforming to the shaping of the end portions 52 of roller 16 and serving the same purpose, that is, for loose fitting, non-journaling reception in the orbiting movement restraining recesses 50 of the bearing unit holder members 46.

In addition, the bearing unit 16B has its race ring members 66B connected together, as by making the race rings 66B integral with the respective sleeve portions 114 that are threadedly connected together as at 118.

Figure 5:
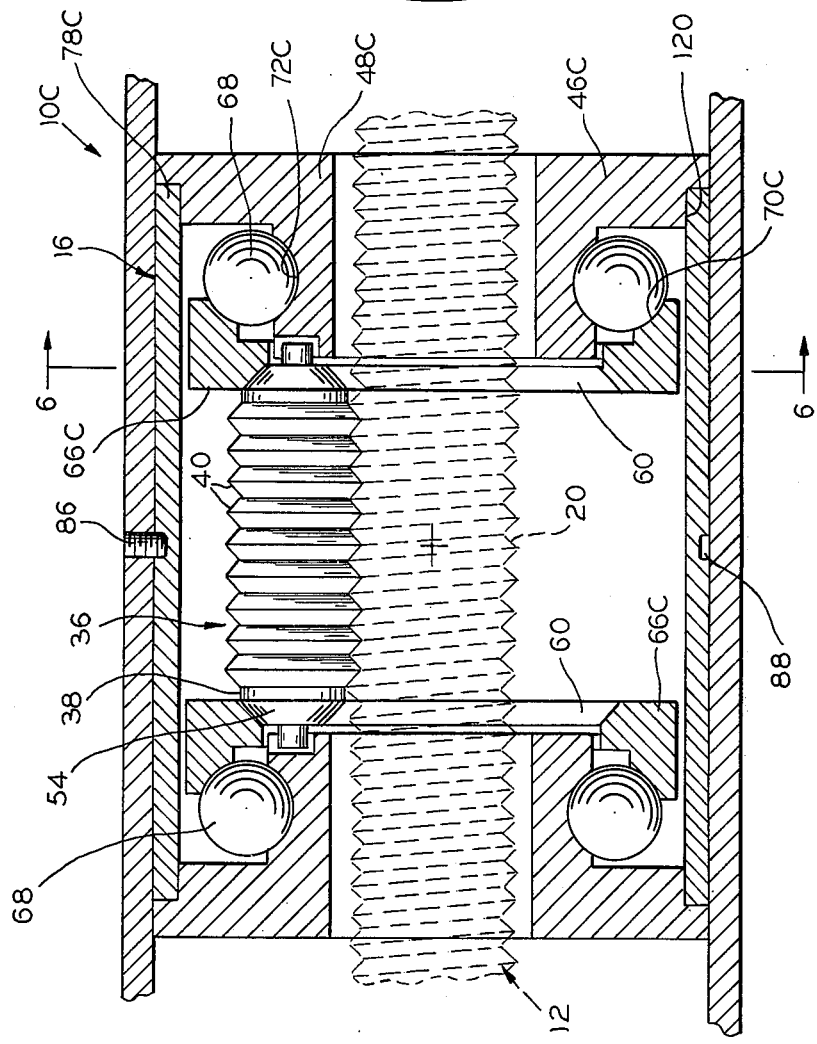
FIG. 5 is a view similar to that of FIG. 1 but illustrating yet another embodiment of the invention.

In the linear actuator 10C of FIGS. 5 and 6, the components involved in the bearing unit 16C are similar to those involved in the bearing unit 16 except for the modified shaping of the bearing unit outer race structure race rings 66C is concerned. In this form of the invention, the race rings 66C are of right angled transverse cross-sectional configuration and the bearing balls 68 ride in raceways 72C that are formed in the hub portions 48C of the respective holder members 46C. The respective holder members 46C are formed to define rim surfaces 120 that are suitably fixed to the ends of the sleeve 78C as by press fitting or employing screwthreading having jamb fit characateristics.

In this embodiment of the invention, the bearing unit 16C is fixed against rotational and longitudinal movement relative to tubular member 18 by employing a set of one or more set screws 86 (such as three disposed 120° apart) applied to encircling groove 88 of sleeve 78C, with the lock rings 82 and the recesses 83 of the tubular member 18 to which they are applied being omitted.

In the showings of FIGS. 1 and 5, one or more of the rollers 36 are omitted to facilitate illustration, but in practice the rollers 36 of these embodiments are three in number located 120 degrees apart about the circumference of shaft 12.

It will therefore be seen that the invention provides a motion translating bearing unit and linear actuator device in which the same may be readily assembled and operated at efficiencies on the order of 90°, that is cabaple of high load carrying capacities, which provides a linear movement on operation of an electrically driven rotary motor that is synchronized with the lead of the threaded shaft that the motor drives, and that is relatively inexpensive to manufacture.

The general arrangement of the embodiments of this invention are particularly adapted for use in computerized operations where the linear movement of a part must exactly follow a predetermined rate of feed that can be embodied into the threading of a rotable shaft.

The linear actuators of this invention operate at efficiencies comparable to the ball and screw type device, but in addition provide for synchronized linear movement and permit the bearing unit rollers and outer race rings to be sold as a separate subassembly, separate and distinct from the operating shaft and tubular member of the linear actuator.

While all the bearing units involved may be arranged to have a suitable number of rollers cooperating with the threading shaft that may be involved, for most applications, a three roller unit will be adequate for load carring capacity.

It is to be noted that in the operation of the device of this invention, the basic thrust load stresses are through the antifriction rolling elements involved.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a linear actuator including a threaded shaft, a linearly movable member to be moved linearly by the shaft and longitudinally of the shaft, a bearing unit operatively connected to said member and shaft for translating rotational movement of said shaft about its axis to linear movement of said member, and means for rotating the shaft about its axis, with said bearing unit comprising a plurality of discrete rollers having right flanges along their shanks spaced for rolling engagement with the shaft threading, said rollers at their ends defining bearing surfaces that are angled relative to their longitudinal axes, an outer race structure defining spaced apart raceway surfaces about the shaft axis about which said roller bearing surfaces respectively ride, and a roller support about which said rollers are received in free rolling nonjournaled relation thereto, said support being formed to be received over the shaft, said roller flanges being free of engagement with said outer race structure, said rollers having projecting end portions and said support being formed for cooperation with said roller end portions to support the rollers against substantial radial displacement radially inwardly of said raceways when the bearing unit is free of the shaft, the improvement wherein:

said outer race structure comprises a pair of ring members, one of said ring members forming one of said raceway surfaces and the other of said ring members forming the other of said raceway surfaces, with said raceway surfaces having their surfacing of circular contour transversely of the shaft axis and across the area of same that is engaged by said roller bearing surfaces, with said raceway surfacing area being a surface of revolution that is smoothly contoured axially of the shaft axis, and said roller bearing surfaces being free of gearing, said raceway surfaces being respectively radially aligned with the respective roller bearing surfaces, and being coaxial with the shaft axis, said support comprising a pair of spaced apart rings coaxial with the shaft axis through which said shaft is received and between which said outer race structure ring members are disposed, said support rings on the sides of same facing the respective roller end portions defining keying recesses in which the respective roller end portions are received for keying said roller end portions to the respective support rings against movement of said rollers about said shaft relative to said support rings, respectively, said roller end portions being free of journalling in their respective recesses, said support ring recesses of the respective support rings being disposed in circumferentially spaced relation about said support rings and being circumferentially aligned at a predetermined radial level about the shaft axis, said raceway surfaces being radially outward of but adjacent said radial level for maintaining said rollers in continuous rolling engagement with the shaft threading, said outer race structure ring members being journalled between and relative to said support rings for free rotational movement of said outer race structure about the shaft axis relative to said support rings, and means for making said support rings fast to said linearly movable member against movement relative to said linearly movable member for holding said rollers against orbiting movement about said shaft on rotation of said shaft, whereby on rotation of said shaft said outer race structure is rotated about said shaft by the rolling engagement of said rollers with said shaft and said outer race structure, with said rollers being held by said support rings against orbiting movement about said shaft and said rolling engagement of said rollers with said shaft effecting linear movement of said bearing unit and the linearly movable member longitudinally of the shaft, whereby said bearing unit and the linearly movable member linear movement is synchronized with the lead of the shaft threading.

2. The improvement set forth in claim 1 wherein:
said race structure ring members are discrete relative to each other.

3. The improvement set forth in claim 1 wherein:
said race structure ring members are fixed together.

4. The improvement set forth in claim 1 wherein:
said means for making said support rings fast to said member to be moved linearly comprises:
a sleeve concentric with the shaft axis,
with said support rings being made fast to said sleeve,
and means for keying said sleeve to said member to be moved linearly against movement of said sleeve relatively to said member to be moved linearly.

* * * * *